March 2, 1943.  H. HEIDEGGER  2,312,760

SPROCKET MECHANISM

Filed June 20, 1939

INVENTOR
Henry Heidegger
BY
Hastings W Baker
ATTORNEY

Patented Mar. 2, 1943

2,312,760

UNITED STATES PATENT OFFICE 2,312,760

SPROCKET MECHANISM

Henry Heidegger, Brooklyn, N. Y., assignor to International Projector Corporation, New York, N. Y., a corporation of Delaware Application June 20, 1939, Serial No. 280,024

6 Claims. (Cl. 287—52)

This invention relates to an improved construction of a sprocket assembly, and particularly refers to the means whereby the sprockets might be secured to a drive shaft without distorting or bending the drive shaft and so as to center the position of the sprockets relative to the shaft so as to avoid the sprockets being eccentrically mounted relative to the shaft.

More particularly my invention relates to a sprocket particularly adapted for use in moving pictures machines, both cameras and projectors, and is of the duplex type, that is two sprockets connected by a hub. In motion picture machines the film is provided with sprocket holes near each of the edges thereof and the duplex sprocket is provided with sprocket teeth to engage the double row of holes in the film and feed it forwardly. The two sprockets are connected by means of a hub and a drive shaft is passed through the two sprockets and the hub. The duplex sprocket is secured to the drive shaft. In the past, great difficulty has been experienced in securing the hub to the drive shaft so that the sprockets will be exactly concentric with the drive shaft and difficulty has been experienced in regard to bending the drive shaft when the duplex sprocket is secured thereto.

The hole passing through the sprockets and the hub is generally reamed out, but when every care is exercised, frequently this hole is not perfectly straight. If the sprockets and hub are then inserted on the shaft and a fastening means is inserted which binds the hub to the shaft when the hole through the hub and sprockets is not perfectly straight, the shaft has been distorted or bent so that when it is rotated the teeth of the sprocket do not follow a perfect circle but gyrate slightly causing an effect as though they were mounted on an eccentric having a small amplitude so that the film is not fed uniformly which is especially disastrous when a sound track is employed on the film. The film must be fed forwardly with absolutely uniform movement and if the shaft is distorted, such uniform movement is impossible.

Frequently the hole through the hub and sprockets is slightly larger than the shaft. If then a screw is inserted through a hole in the hub and passes into the shaft securing the hub to the shaft, the side of the hub adjacent the screw is bound tightly against the shaft but the side of the hub opposite the screw is spaced from the shaft so that the sprocket is now eccentrically mounted relative to the shaft with the result when the shaft is rotated, the film is not fed forward uniformly, which would give very imperfect results in so far as the sound or picture are concerned.

The object of this invention is to provide a simple means to overcome all of said difficulties. I have shown the invention by way of illustration in the attached drawing in which.

In the various views the same reference character applies to similar parts.

Figure 1:
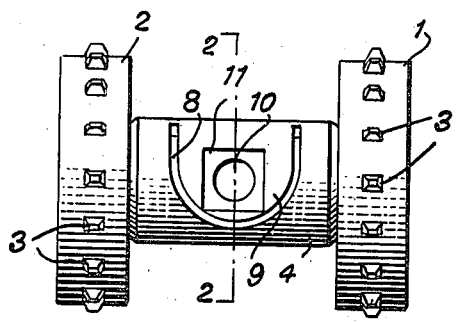
Fig. 1 is a side elevational view of my improved sprocket mechanism.
Figure 2:
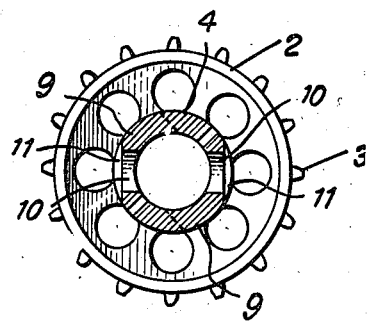
Fig. 2 is a cross-sectional view on the line 2—2 of Fig. 1.
Figure 3:
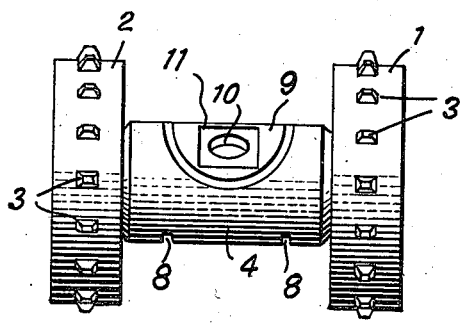
Fig. 3 is a view similar to Fig. 1 but with the sprockets rotated something less than 90 degrees from the position of the parts shown in Fig. 1.
Figure 4:
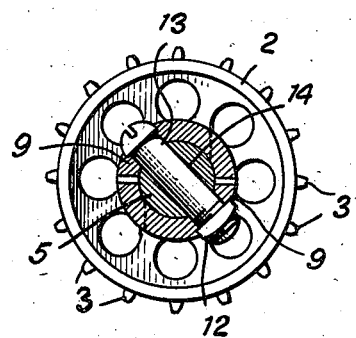
Fig. 4 is a view similar to Fig. 2 but with the sprockets rotated something less than 90 degrees from the position shown in Fig. 2 and showing in cross-section the drive shaft and the means whereby the hub of the sprocket is secured to the shaft.

The sprocket mechanism consists of two sprockets 1 and 2 having the conventional sprocket teeth 3 which project through the holes in the film and serve as a means to feed the film forwardly. The sprockets 1 and 2 are connected by a hub 4 which is secured to a drive shaft 5.

In the past, a sprocket has been provided with a hub secured to a drive shaft. It has usually been secured to the drive shaft by means of a screw which passes through the hub and into the drive shaft. In the past this had resulted in the screw pressing the hub tightly against the shaft on the side where the screw is which has left a space on the opposite side so that the sprocket was eccentrically mounted on the drive shaft and when the drive shaft would rotate, the sprocket teeth would not describe a true circle but they would have a movement as though they were mounted on an eccentric. Furthermore, if the hole through the sprockets and hub was not absolutely straight, this screw would bind the hub of the sprockets to the shaft so as to distort the shaft, that is to bend it with the result that when the shaft was rotated the film would be fed forwardly unevenly or non-uniformly. As stated in the objects of the invention the present invention relates to a simple mechanism to overcome the difficulties recited above.

I accomplish these improved results in the following manner.

I cut out of the hub 4 two U-shaped channels 8, thereby forming two U-shaped flaps 9 spaced 180 degrees apart. Each of these flaps is provided with a diametrically extending hole 10 and each of the flaps 9 adjacent the hole 10 is provided with a cut-away recess 11. A nut 12 is placed in one of these recesses and the side walls of the recess prevent this nut from turning. A headed bolt 13 is then passed through the opposite hole 10 and through a hole 14 extending through the shaft 5. A screwdriver is used to rotate the bolt 13 which is threaded to receive the nut 12 and a bolt 13 is rotated. The head of the bolt and the nut 12 provide equal tension on each of the flaps drawing these resilient flaps into contact with the shaft and without distorting the shaft and avoiding all eccentricity so that the sprocket is mounted exactly concentrically with the axis of the shaft.

I realize that many changes may be made in the specific form of the invention shown by way of illustration in the drawing and described in the specification and I, therefore, desire to claim the same broadly, except as I may limit myself in the annexed claims.

Having now described my invention, I claim:

1. A circular hub having two channels therein forming two flaps as a part of said hub, a shaft passing through said hub and between said flaps, and drawing means passing through the flaps and shaft to draw said flaps simultaneously into engagement with said shaft and to secure said hub in concentric position on said shaft.

2. A circular hub having two channels therein forming two flaps as a part of said hub, a shaft passing through said hub and between said flaps, a bolt passing through a hole in each of said flaps and through a hole in the said shaft, and a nut secured to said bolt, said bolt and nut serving as a drawing means to draw said flaps simultaneously into engagement with said shaft and to secure said hub in concentric position on said shaft.

3. A circular hub, a shaft on which the hub is mounted, two flaps forming a part of said hub and drawing means to draw said flaps simultaneously into engagement with said shaft and to impose equal tension on said flaps, said means serving as a means to bind said hub in concentric position on said shaft.

4. A hub having two U-shaped channels therein forming two flaps as a part of said hub, a shaft passing through said hub and between said flaps, said flaps being provided with holes, the hole in one flap being spaced 180 degrees from the hole in the other flap, a headed bolt adapted to be passed through the holes in the flaps and through a hole extending diametrically through the shaft and a nut secured on the end of said bolt opposite from the head thereof.

5. A hub having two U-shaped channels therein forming two flaps as a part of said hub, a shaft passing through said hub and between said flaps, said flaps being provided with holes, the hole in one flap being spaced 180 degrees from the hole in the other flap, a headed bolt adapted to be passed through the holes in the flaps and through a hole extending diametrically through the shaft, a nut secured on the end of said bolt opposite from the head thereof and means to prevent said nut from rotating.

6. A hub consisting of a mid-portion and two end portions, the two end portions each forming a complete circle, the mid-portion being provided with two slots forming flaps, the said flaps being 180° apart, a shaft extending through said hub, a headed bolt passing through a hole in one of the flaps through the shaft and through a hole in the other flap, the head of the bolt engaging one of the flaps and a nut through which said bolt is threaded and adapted to engage the other flap so that when said bolt is rotated the flaps are simultaneously and equally moved into engagement with the shaft to precisely center said hub on said shaft.

HENRY HEIDEGGER.